United States Patent
Kwon et al.

(10) Patent No.: US 7,068,613 B1
(45) Date of Patent: Jun. 27, 2006

(54) METHOD AND APPARATUS FOR STOPPING DATA/PACKET TRANSMISSION

(75) Inventors: Sung Lark Kwon, Seoul (KR); Jin Sung Choi, Anyang-shi (KR); Young Dae Lee, Hanam-shi (KR)

(73) Assignee: LG Electronics Inc., Seoul (KR)

( * ) Notice: Subject to any disclaimer, the term of this patent is extended or adjusted under 35 U.S.C. 154(b) by 1208 days.

(21) Appl. No.: 09/718,372

(22) Filed: Nov. 24, 2000

(30) Foreign Application Priority Data

Nov. 24, 1999 (KR) .................................... P1999-52458

(51) Int. Cl.
*H04B 7/005* (2006.01)

(52) U.S. Cl. ....................... 370/278; 370/282; 370/342; 455/404; 455/466; 455/521

(58) Field of Classification Search ................ 370/276, 370/278, 282, 310, 311, 312, 328, 342; 455/404, 455/422, 466, 521, 511, 527, 68, 69
See application file for complete search history.

(56) References Cited

U.S. PATENT DOCUMENTS

| | | | |
|---|---|---|---|
| 5,790,534 A | | 8/1998 | Kokko et al. |
| 5,841,768 A | * | 11/1998 | Ozluturk et al. ............. 370/335 |
| 6,169,759 B1 | * | 1/2001 | Kanterakis et al. ......... 375/130 |
| 6,292,471 B1 | * | 9/2001 | Cao et al. .................... 370/252 |
| 6,324,207 B1 | * | 11/2001 | Kanterakis et al. ......... 375/141 |
| 6,339,713 B1 | * | 1/2002 | Hansson et al. ............. 455/574 |
| 6,389,056 B1 | * | 5/2002 | Kanterakis et al. ......... 375/130 |
| 6,574,267 B1 | * | 6/2003 | Kanterakis et al. ......... 375/141 |
| 6,606,341 B1 | * | 8/2003 | Kanterakis et al. ......... 375/130 |
| 6,721,299 B1 | * | 4/2004 | Song .......................... 370/342 |

FOREIGN PATENT DOCUMENTS

| | | |
|---|---|---|
| EP | 0 831 669 A2 | 3/1998 |
| WO | WO 99/38278 | 7/1999 |

OTHER PUBLICATIONS

Guo, Ning, Morgera, Salvatore D., and Mermelstein, Paul, Common Packet Data Channel (CPDC) Architecture of CDMA Integrated Wireless Access Networks, IEEE, Jan. 1995 pp. 253–258.
Technical Specification, Universal Mobile Telecommunications System (UMTS); Physical Layer Procedures (FDD), (3G TS 25,214 version 3.2.0 Release 1999) ETSI TS 125 214 v3.2.0 (Mar. 2000).

(Continued)

Primary Examiner—Hassan Kizou
Assistant Examiner—Dmitry Levitan
(74) Attorney, Agent, or Firm—Fleshner & Kim, LLP (57) ABSTRACT

Disclosed is a method of transmitting emergency stop control information on a common packet channel (CPCH) in a mobile communication system, which can perform an emergency stop within a less period of time when the user equipment is in a state of transmitting a packet through the CPCH by rapidly transmitting he emergency stop control information. The method of transmitting emergency stop control information on a CPCH is a radio mobile communication system comprises a first step of inserting and transmitting a predetermined bit pattern to a downlink (DL) dedicated physical channel (DPCH) by a universal mobile terrestrial radio access network (UTRAN), a second step of recognizing the particular bit pattern by the UE, and a third step of controlling data transmission through an uplink (UL) CPCH by the UE. Thus, the method according to the invention has an effect of more rapidly transmitting urgent control information through the DL DPCCH or the DPDCH, which are related to the CPCH, or through both of these two channels when the UE is transmitting a packet through the CPCH currently allocated to the UE.

22 Claims, 4 Drawing Sheets

OTHER PUBLICATIONS

Technical Specification, 3rd Generation Partnership Project (3GPP); Technical Specification Group Radio Access Network Physical Layer Procedures (FDD), (3G TS 25,214 version 3.0.0) 3G TS 25 214 v3.0.0 (Oct. 1999), XP-002255405.

3rd Generation Partership Project; Technical Specification Group Radio Access Network; Physical channels and mapping of transport channels onto physical channels (FDD) (3G TS 25.211 version 3.0.0), Oct. 1999, http://www.3gpp.org/ftp/Specs/1999-10/25_series/25211-300.zip.

Foreign Office Action and English language translation.

* cited by examiner

METHOD AND APPARATUS FOR STOPPING DATA/PACKET TRANSMISSION

BACKGROUND OF THE INVENTION

1. Field of the Invention

The present invention relates to a mobile communication system, and more particularly to a method of transmitting emergency stop control information on an uplink common packet channel used in a mobile communication system of a wideband-code division multiple access (W-CDMA) type.

2. Description of the Related Art

In general, a reference specification of a Third Generation Partnership Project group(3GPP), which is one of the organizations establishing an IMT-2000 mobile communication standard, defines and describes transport channels and physical channels of an uplink (UL) and a down link (DL).

Of the transport channels defined in the 3GPP standard, a common packet channel (CPCH) is used in the uplink for transporting packets of relatively medium or small size. The CPCH is related to a dedicated physical control channel (DPCCH), which is one of the two types of the dedicated physical channel (DPCH) that is a physical channel of a DL physical channel to be explained later.

Figure 1:
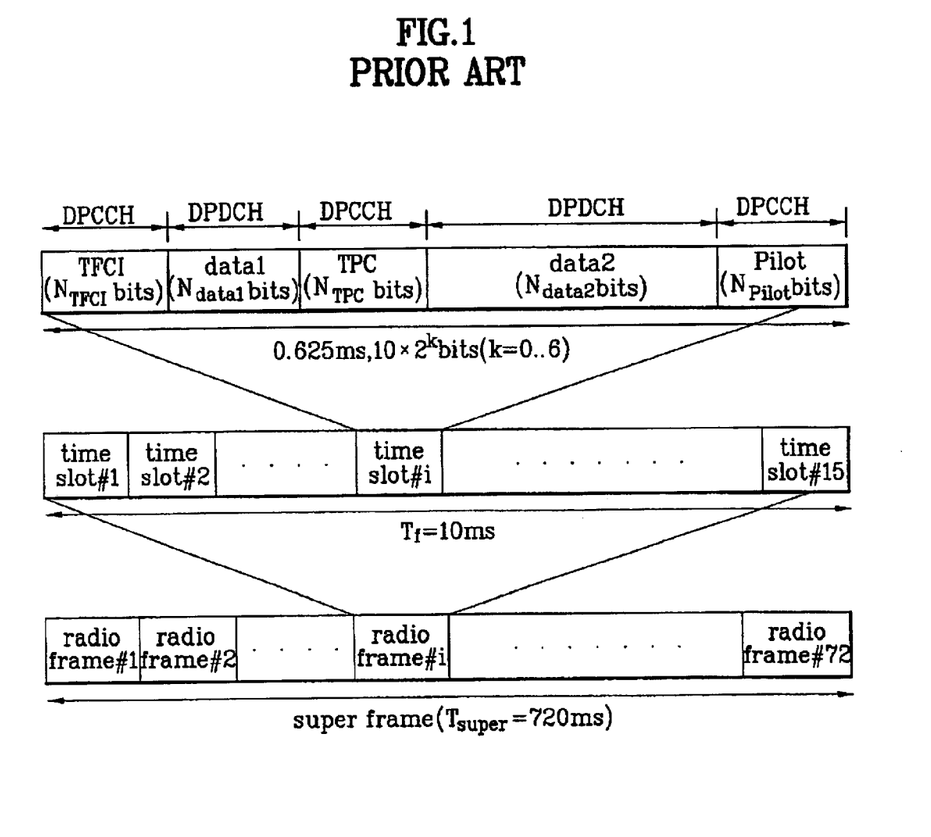
FIG. 1 is a block diagram illustrating a structure of the DL DPCH in accordance with the 3GPP.

The DPCH generally comprises a three-layer structure: super frames, radio frames, and time slots. FIG. 1 shows a DPCH structure used in the Down Link.

The DPCH has two types: a dedicated physical data channel (DPDCH) for transferring data of an upper layer; and a DPCCH transferring control information of a physical layer.

FIG. 1 shows a structure of the DL DPCH in accordance with the 3GPP standard. Referring to FIG. 1, the DL DPCCH for transferring the control information comprises several fields such as a pilot field, a transport format combination indicator (TFCI) field, a feedback information (FBI) field, and a transport power control (TPC) field.

Figure 2:
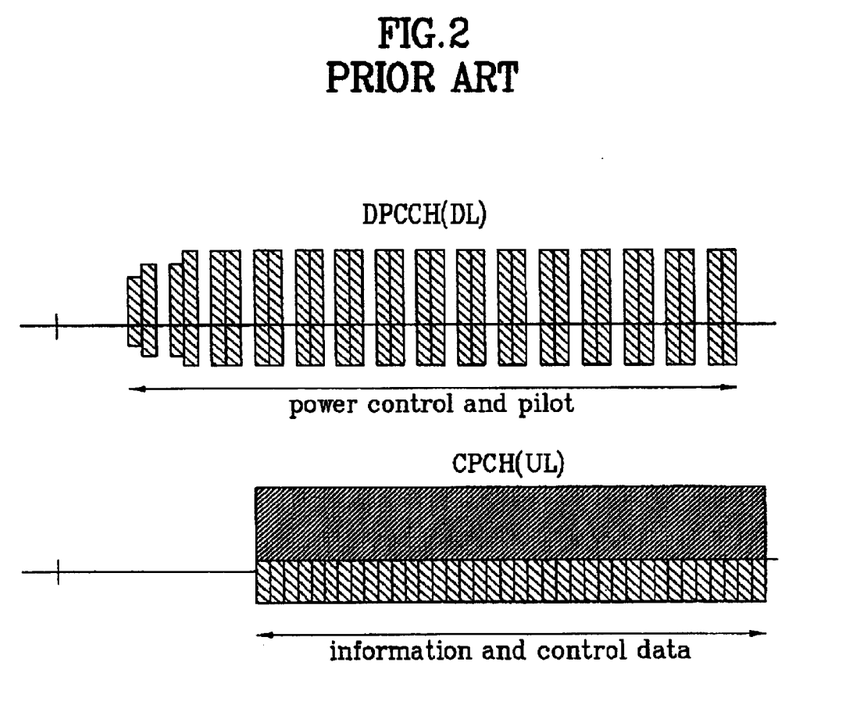
FIG. 2 is a diagram illustrating relations between the DL DPCCH and the CPCH in accordance with the 3GPP.

FIG. 2 shows relations between the DL DPCCH and the CPCH in accordance with the 3GPP interim standard. Referring to FIG. 2, the DL DPCCH is used to control power of the CPCH. When the DL DPCCH is used to control the transmission power of the CPCH, Only the DPCCH is transmitted without the DPDCH because no data are needed to be transmitted through the DPCH. At this stage in particular, the pilot bit and the transport power control (TPC) bit only are transmitted through the DPCCH. Table 1 below shows the channel information on the DPCCH and DL DPDCH in that case.

The universal mobile terrestrial radio access network (UTRAN) allocates an available Common Packet Channel (CPCH) to the UE, which transmits a packet in a random access manner.

Thereafter, the packet is transmitted through the UL CPCH. Prior to the transmission, a power control is performed with respect to the UL CPCH by the DPCCH only for a particular period of time.

The UTRAN measures a signal to inference ratio (SIR) with respect to the CPCH, and generates a transport power control (TPC) bit based on the measured value so as to be transmitted through the DL DPCCH.

The UE measures the SIR with respect to the DL DPCCH, and generates the TPC bit based on the measured value so as to be transmitted through the UL DPCCH. If the initial transmission power control is completed to be sufficient for packet transmission, the packet is transmitted through the UL CPCH.

While the packet is transmitted through the CPCH, the UE does not monitor other channels. Even during the transmission of the corresponding packets through the CPCH as described above, however, occasions arise to require interruption of the packet transmissions through the CPCH or release of the channel.

Nevertheless, the standard contributed in the 3GPP has failed yet to suggest any control procedures suitable for interrupting the packet transmission through the CPCH or an emergency stop to urgently release the CPCH, through which the packet is transmitted.

A considerable measure would be a method of transmitting emergency stop control information through a control channel. For instance, it is possible to receive emergency stop control information through other channels than the DL DPCH, e.g., a broadcasting channel (BCH), which is a transport channel, and a primary common control physical channel (PCCPCH), which is a DL physical channel, while the UE is transmitting the packets through the CPCH. However, the control information transmitted through the CCH can be restored as the original information only by undergoing a decoding procedure. Therefore, the period of time until obtaining the control information for an emergency stop becomes longer than the transport time interval (TTI) of the corresponding channel, which transmits the minimum control information.

SUMMARY OF THE INVENTION

It is, therefore, an object of the present invention to provide a method of transmitting emergency stop control information on a CPCH in a mobile communication system,

TABLE 1

| Kbps | Ksps | Spreading Factor | Bits/Frame DPDCH | Bits/Frame DPCCH | Bits/Frame TOTAL | Bits/Slot | DPDCH of Bits/Slot $N_{data1}$ | DPDCH of Bits/Slot $N_{data2}$ | DPCCH of Bits/Slot $N_{TFCI}$ | DPCCH of Bits/Slot $N_{TPC}$ | DPCCH of Bits/Slot $N_{pilot}$ |
|---|---|---|---|---|---|---|---|---|---|---|---|
| 15 | 7.5 | 512 | 60 | 90 | 150 | 10 | 2 | 2 | 0 | 2 | 4 |

The system adopting the 3GPP standard using the above channels is a asynchronous type which does not synchronize signals of other base station and even between signals down linked within a base station. Therefore, a random access manner is applied so that a plurality of user equipments (UE) can effectively transmit signals.

which can perform an emergency stop within a less period of time in a UE by rapidly transmitting the emergency stop control information when the UE is transmitting a packet through the CPCH currently allocated to the UE.

To achieve the above object, there is provided a method of transmitting emergency stop control information on a CPCH in a radio mobile communication system, which transmits packet data to a network through the UL CPCH allocated to the UE, the method comprising the steps of: transmitting a predetermined bit pattern to a user equipment after inserting said predetermined bit pattern into a DL DPCH by a UTRAN; recognizing the predetermined bit pattern by the UE; and controlling the data transmission through the UL CPCH by the UE.

To achieve the above object, there is also provided a method of transmitting emergency stop information on a CPCH in a radio mobile communication, the method comprising the steps of: transmitting a corresponding packet through the UL CPCH allocated to the UE; inserting a predetermined bit pattern to a DL DPCH and transmitting the same to the UE by a UTRAN when the UTRAN desires to transmit control information to the UE so as to command interruption of the packet transmission; and interrupting the packet transmission through the CPCH after confirming the predetermined bit pattern by the UE.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 3:
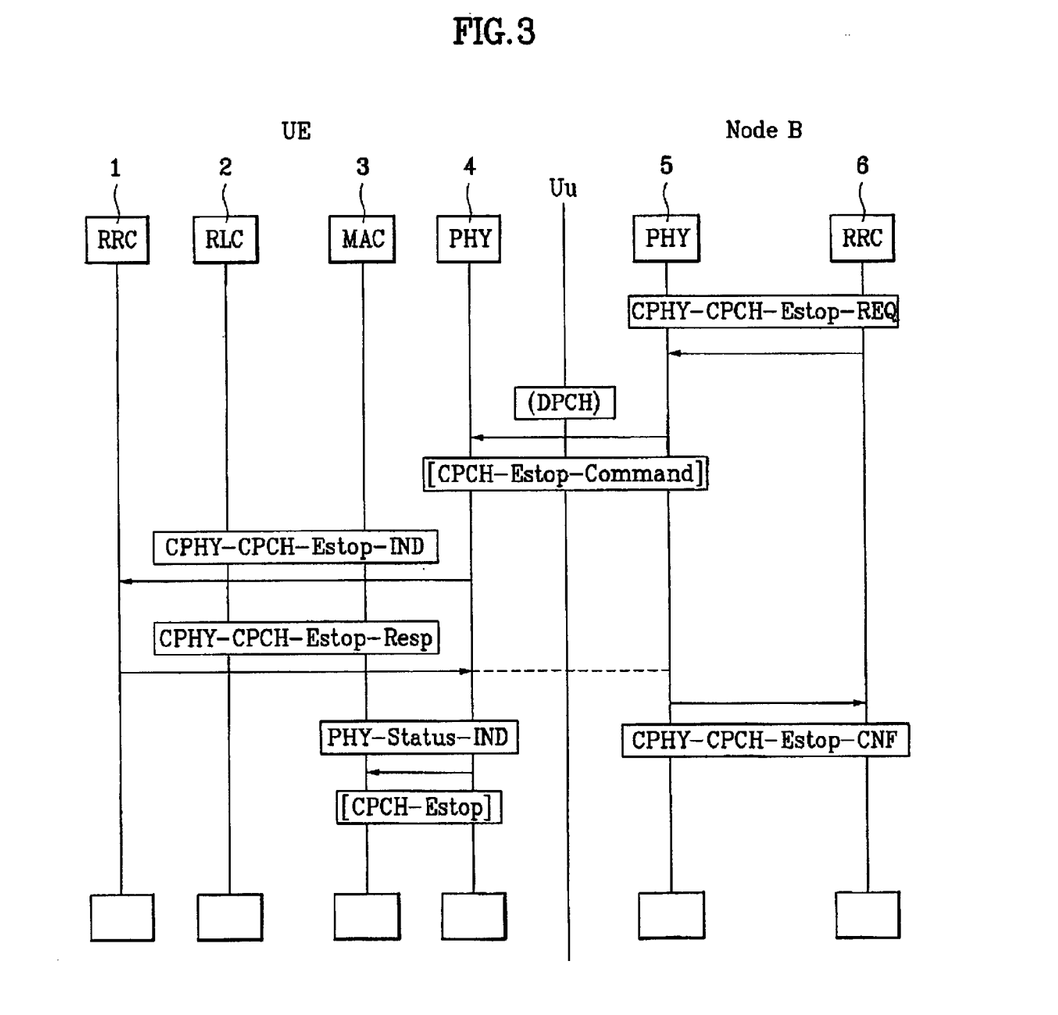
FIG. 3 is a flow chart illustrating an order of the signal transfer to exemplify a method of transmitting control information on the CPCH according to the present invention.

FIG. 3 is a flow chart illustrating an order of the signal transfer to exemplify a method of transmitting control information on the CPCH according to the present invention. The transfer of an emergency stop signal in the method of transmitting control information on the CPCH according to the present invention is to solve an abnormal system operation that may occur in the course of transmitting the CPCH data by a base station (Node B) RRC 6. (e.g., to solve a temporary overload of a cell capacity). Therefore, an emergency stop of the CPCH is performed as shown in FIG. 3.

A first layer of the base station (Node B L1), which has received an emergency stop command from the Node B RRC 6 through CPHY-CPCH-Estop-REQ, transmits an emergency stop command, i.e., a CPCH-Estop-Command, to a physical layer of the UE (UE-PHY) 4 through the DL DPCCH.

The UE PHY 4 transmits the CPHY-CPCH-Estop-IND to the UE RRC 1 immediately upon detection of the CPCH-Estop-Command to report such fact. At this stage, the UE RRC 1 transfers a CPHY-CPCH-Estop-Resp to the UE L1 of the UE-PHY 4 to command interruption of a message transmission through the CPCH.

The UE L1 of the UE-PHY 4 performs an interruption of a message transmission, i.e., an emergency stop, in accordance with the command from the UE RRC 1.

After interruption of the CPCH of the UE L1 by the UE-PHY 1, the UE L1 of the UE_PHY 1 transmits a PHY-Status-IND to a UE medium access control layer (UE-MAC) 3 to inform completion of the emergency stop.

Meanwhile, the Node B L1 of the Node B-PHY, which has detected a CPCH link loss, transmits a CPHY-CPCH-Estop-CNF to the Node B RRC 6. At this stage, the transmission of the DL DPCCH is also interrupted.

The following is a description of a method of transmitting control information on the CPCH according to the present invention by exemplifying the case of not transmitting a transport format combination identifier (TFCI) bit through the DL DPCCH as well as the case of transmitting the TFCI bit.

Figure 4:
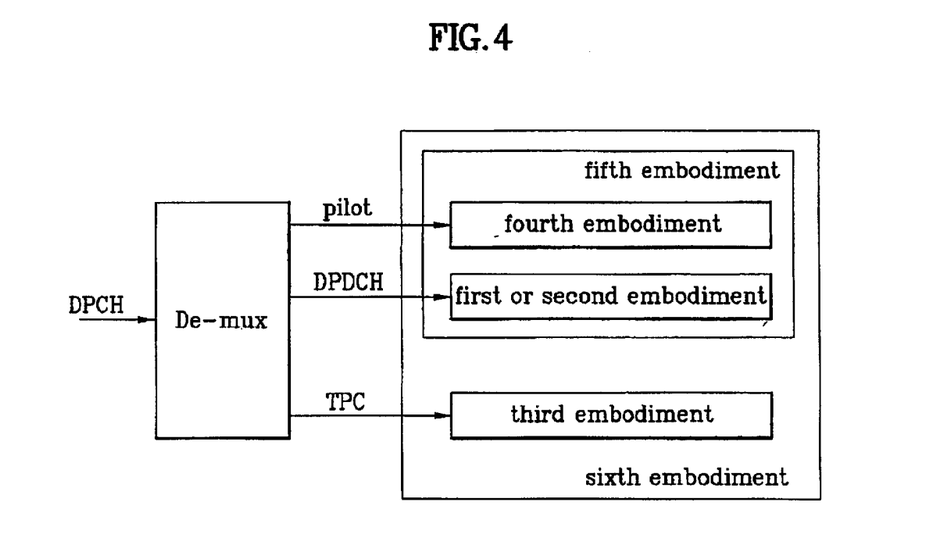
FIG. 4 is a block diagram illustrating various embodiments of transmitting control information on the CPCH according to the present invention.

FIG. 4 is a block diagram illustrating various embodiments of transmitting control information on the CPCH according to the present invention.

First, in case of not transmitting the TFCI bit through the DL DPCCH (or in case when the TFCI is absent in the DPCCH), the control information on the CPCH is transmitted by means of the DL DPDCH. Depending on the case, fields of the DL DPCCH are used in combination to transfer the control information. Since the control information such as an emergency stop should be transmitted without a delay in transmission or reception, the control bit notifying the emergency stop is consecutively transmitted in a slot unit throughout the entire frame according to the present invention.

A first embodiment of the above case is according to the conventional technology where the DL DPCCH is used for power control of the CPCH but the DPDCH is not transmitted under a normal state when packets are currently being transmitted through the UL CPCH. According to the present invention, however, bit stream of a particular pattern is transmitted through the DPDCH to transfer the control information for an emergency stop to the UE.

A second embodiment according to the present invention is that the DL DPCCH is used for power control of the CPCH under a normal state when packets are currently being transmitted through the UL CPCH. Under such a normal state, bit stream of a particular pattern is repeatedly transmitted to the DPDCH as well. Under an emergency stop control state of requiring a transfer of emergency stop control information to the UE, however, bit stream of another pattern is transmitted through the DPDCH. For instance, "0000" is transmitted through the DPDCH under a normal state, while "1111" is transmitted under an emergency stop control state.

A third embodiment is to apply both the first and the second embodiments to the emergency stop state. In that case, a power control bit notifying the power lowering command is inserted and transmitted to the TPC field of the DL DPCCH.

A fourth embodiment is that, under a normal state where packets are currently being transmitted through the UL CPCH, a general pilot bit pattern is inserted and transmitted to the pilot field of the DL DPCCH. Under the state of an emergency stop control requiring a transfer of emergency stop control information to the UE, another arbitrary pilot bit pattern is transmitted. For instance, under an emergency stop control state, a separate pilot bit pattern of "0000" or a pilot bit pattern having a perpendicularity to the pilot pattern is transmitted unlike under the normal state. To be specific, if the bit stream inserted to the pilot field under the under a normal state is N number of bits, N/2 bits of the least significant bit (LSB) or the most significant bit (MSB) is inversed among the N number of bits for insertion and transmission. Otherwise, a code is inversed with respect to a pilot bit pattern of a normal state for insertion and transmission.

A fifth embodiment is to apply both the first and the second embodiments to the emergency stop state. A power control bit notifying a power lowering command is inserted and transmitted to the TPC field of the DL DPCCH. Also, a pilot bit pattern different from the pilot bit pattern that is used to be transmitted under the normal state as in case of the fourth embodiment is transmitted to the DL DPCCH. In that case, the bit pattern transmitted through the DPDCH is either perpendicular to or has a different code from the pilot bit pattern transmitted through the DPCCH under a normal state and under an emergency stop control state.

A sixth embodiment is to apply either the first embodiment or the second embodiment to the emergency stop control state. The bit pattern inserted to the TPC of the DL DPCCH is arranged to have a perpendicularity to the bit pattern transmitted through the DPDCH. Also, a pilot bit pattern having a perpendicularity to the pilot bit pattern, which is used to be transmitted under the normal state as in case of the fourth embodiment, is a transmitted to the DL DPCCH. For instance, the bit inserted to the TPC field is arranged to be "1, −1" or "−1, 1". In that case, the bit pattern transmitted from a single slot through the DPDCH is either perpendicular to or has a different code from the TPC bit pattern and the pilot bit pattern transmitted through the DPCCH under a normal state and under an emergency stop control state.

Table 2 below shows a case of transmitting the TFCI bit through the DL DPCCH. The channel information on the DL DPCCH and DL DPDCH is shown in that case.

emergency stop. Here, the contents of the 2 bits allocated for the emergency stop are "00" under a normal state, and "11" under an emergency state.

The following is a more detailed description of the procedure of transmitting the control information on the CPCH by applying each embodiment enlisted above.

Figure 5:
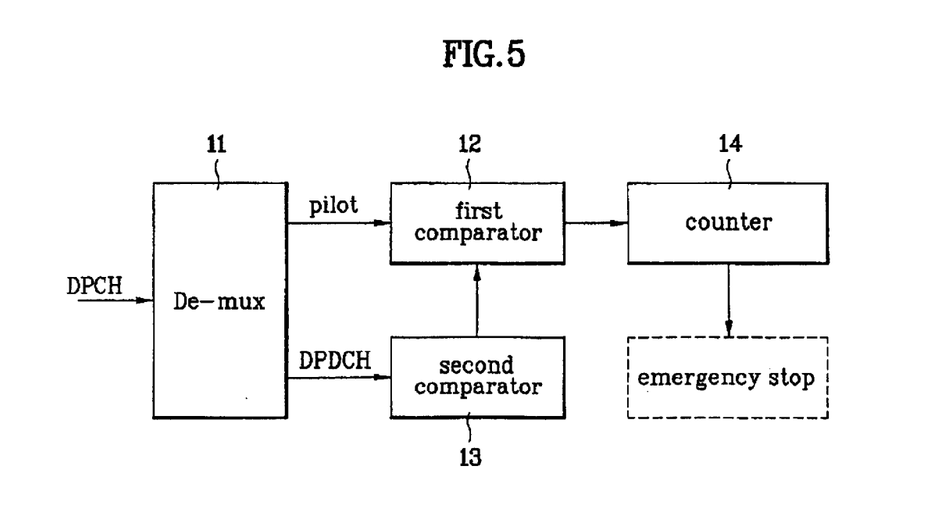
FIG. 5 is a block diagram illustrating a construction of a device for embodying the method of transmitting the control information on the CPCH according to an embodiment of the present invention.

FIG. 5 is a block diagram illustrating a construction of a device for embodying the method of transmitting the control information on the CPCH according to an embodiment of the present invention.

The device for embodying the method of transmitting the control information on the CPCH comprises: a De-MUX 11 for de-muxing data of the DPCH; a first comparator 12 for comparing the pilot signal among the data; a second comparator 13 for comparing data of the DPDCH among the data of the DPCH; and a counter 14 for counting an output signal of the first comparator 12, and generating a command for emergency stop in accordance with the counted resulted.

When the first and the second embodiments are applied to the device in FIG. 5, the UE decodes the data existing in the DPDCH as well in addition to the decoding of the DPCCH.

In the first embodiment of transmitting the bit stream of a particular pattern through the DPDCH, a DPDCH transmission energy is used unlike the conventional technology. Therefore, the UE confirms whether or not an energy exists in the DPDCH and whether or not the bit stream of the particular pattern is transmitted through the DPDCH so as to recognize the control information such as the emergency stop.

In the second embodiment, the UE continuously decodes the DPDCH. If transmission of the bit stream of other patterns than the one of the normal state is confirmed, transmission of the control information such as the emergency stop is recognized.

If the emergency stop control information is continuously received by more than a predetermined number of slots, the UE interrupts packet transmission through the CPCH.

The following is a description of a case when the third embodiment is applied to the device in FIG. 5. In this case, both the first and the second embodiments are applied to the emergency stop control state. A power control bit notifying a power lowering command is inserted and transmitted to

TABLE 2

| | | Spreading | | Bits/Frame | | | DPDCH of Bits/Slot | | DPCCH of Bits/Slot | | |
|---|---|---|---|---|---|---|---|---|---|---|---|
| Kbps | Ksps | Factor | DPDCH | DPCCH | TOTAL | Bits/Slot | $N_{data1}$ | $N_{data2}$ | $N_{TFCI}$ | $N_{TPC}$ | $N_{pilot}$ |
| 15 | 7.5 | 512 | 60 | 90 | 150 | 10 | 0 | 2 | 2 | 2 | 4 |

All the embodiments except the sixth one described above are applicable to the case of transmitting the TFCI bit through the DL DPCCH. The remaining bit pattern excluding the TFCI bit from a single slot may be applicable even to the case of transmitting the TFCI through the DL DPCCH so as to be perpendicular to or have a different code with the bit pattern of the DPDCH. Also, the control signal may be transmitted by using the data of the TFCI field. When the information of other purposes than the emergency stop is transmitted to the TFCI field, 10 information bits per frame are shared by other different information. For instance, 8 bits out of 10 information bits are used for transmission of channel information, while the remaining 2 bits are used for the TPC field of the DL DPCCH. This is to prevent a full use of the power by the UE.

The following is a description of a case when the fourth embodiment is applied to the device in FIG. 5. Under a normal state where packets are currently being transmitted through the UL CPCH, a general pilot bit pattern is inserted and transmitted to the pilot field of the DL DPCCH. Under an emergency stop control state requiring a transfer of the emergency stop control information to the UE, a pilot bit pattern of another arbitrary pattern is transmitted. In that case, the UE needs not continuously decode with respect to the DPDCH unlike the first and the second embodiments.

The following is a description of a case when the fifth embodiment is applied to the device in FIG. 5. In this case, either the first or the second embodiment is applied to the emergency stop control state. A power control bit notifying a power lowering command is inserted and transmitted to the TPC field of the DL DPCCH. Also, a pilot bit pattern having a perpendicularity to the pilot bit pattern, which is used to be transmitted under the normal state as in case of the fourth embodiment, is transmitted to the DL DPCCH. Once the UE recognizes, while continuing the decoding of the DPDCH, whether or not an energy exists in the DPDCH and whether or not a bit stream of a particular pattern has been transmitted through the DPDCH, the UE confirms such fact by means of a particular pilot bit pattern representing the emergency stop control information on the pilot field of the DL DPCCH. In this case, by contrast, it is first recognized whether or not the particular pilot bit pattern representing the emergency stop control information has been transmitted to the pilot field of the DL DPCCH. The UE then continues to decode the DPDCH, and confirms the above recognition by detecting whether or not an energy exists in the DPDCH and whether or not the bit stream of a particular pattern has been transmitted through the DPDCH. The emergency stop control information may be confirmed by simultaneously performing the above operations.

The following is a description of a case when the sixth embodiment is applied to the device in FIG. 5. The bit pattern transmitted through the DPDCH per slot is compared with the bit pattern transmitted through the DPCCH. Depending on the compared result whether or not the bit patterns of the two channels are perpendicular, transmission of the emergency stop control information is confirmed.

As described above, the UE can confirm reception of the control information such as the emergency stop through each embodiment enlisted above.

In short, where there is a need to transmit the emergency stop control command to the UE, the UTRAN uses a predetermined method among the ones exemplified in the above embodiments. Here, the emergency stop control information is continuously transmitted through each slot.

The UE continuously monitors whether or not any emergency stop control information exists. If any control information is first recognized, the UE detects the emergency stop control information by monitoring a predetermined number of slot intervals. The UE interrupts the packet transmission through the CPCH if the emergency control information is continuously received by more than a predetermined number of slots.

The UTRAN then transmits an emergency stop control command, and confirms whether or not the packet transmission has been interrupted from the UE.

The method of transmitting control information on the CPCH according to the present invention has an effect that the urgent control information is more rapidly transmitted through the DL DPCCH or the DPDCH or through both of these two channels, which are related to the CPCH, when the UE is in the state of transmitting packets through the currently allocated CPCH. Further, the method according to the present invention also has an effect of transmitting the control information on a faster velocity but also with reliability.

While the invention has been shown and described with reference to the certain preferred embodiments thereof, it will be understood by those skilled in the art that various changes in form and details may be made therein without departing from the spirit and scope of the invention as defined by the appended claims.

What is claimed is:

1. A method of performing an emergency stop of a packed transmission on a common packet channel (CPCH) in a communication system, the method comprising:
    transmitting a corresponding packet through an uplink (UL) CPCH by a user equipment (UE);
    sending a predetermined bit pattern to the user equipment (UE) through a downlink (DL) dedicated physical channel (DPCH);
    detecting the predetermined bit pattern of an emergency stop command by the UE; and
    stopping the packet transmission through the CPCH by the UE upon detection.

2. The method of claim 1, wherein DL DPCH includes a DL dedicated physical data channel (DPDCH) and a DL dedicated physical control channel (DPCCH), and the predetermined bit pattern is inserted in at least one of DPDCH or DPCCH.

3. The method of claim 2, wherein the predetermined pattern is inserted in at least one of:
    (a) DPDCH;
    (b) a TPC field of the DPCCH; or
    (c) pilot field of the DPCCH.

4. The method of claim 1, wherein the predetermined bit pattern is provided within a DPCCH frame of the DPCH.

5. The method of claim 1, wherein the DPCH includes DPCCH, and the DPCCH includes a control command field for the predetermined bit pattern.

6. The method of claim 5, wherein the predetermined bit pattern is [1111].

7. The method of claim 6, wherein the predetermined bit pattern is provided in a pilot field of a DPCCH of the DPCH.

8. The method of claim 6, wherein a power control bit notifying a power lowering command is transmitted in a TPC field of a DL DPCCH with the predetermined bit pattern.

9. A method of controlling a network resource during packet transmission by a user equipment (UE) to a network, the method comprising:
    transmitting a predetermined bit pattern to the UE after inserting the predetermined bit pattern into a frame of downlink (DL) dedicated physical channel (DPCH) by the network;
    detecting the predetermined bit pattern by the UE; and
    stopping packet transmission through the allocated network resource by the UE.

10. The method of claim 9, wherein the predetermined bit pattern is inserted into an unused field in the frame of a downlink dedicated physical data channel (DPDCH) of the DPCH during the packet transmission on an uplink common packet channel (CPCH).

11. The method of claim 9, wherein the predetermined bit pattern is indicative of an emergency stop of a packet transmission due to an abnormal condition in the network.

12. An emergency stop procedure during transmission of data through CPCH by a UE to a UTRAN comprising:
    providing a CPHY-CPCH-Estop-REQ primitive from a node B radio resource control layer (RRC) to a Node B physical layer;
    sending a CPCH-Estop-Command from the node B physical layer to a UE physical layer;
    sending a CPHY-CPCH-Estop-IND primitive from the UE physical layer to the UE-RRC upon reception of the CPCH-Estop-Command;

providing a CPHY-CPCH-Estop-Resp primitive from the UE-RRC to the UE physical layer in reply to the CPHY-CPCH-Estop-IND primitive; and executing CPCH emergency stop by the UE physical layer.

13. The emergency stop procedure of claim 12, further comprising sending a PHY-Status-Ind primitive from the UE physical layer to a UE-MAC layer indicating a completion of the CPCH emergency stop.

14. The emergency stop procedure of claim 12, further comprising sending a CPHY-CPCH-Estop-CNF primitive from the Node B physical layer to the node B-RRC when Node B physical layer detects CPCH link loss.

15. A method of sending a frame for a dedicated physical channel, wherein the improvement comprises:

sending the frame, the frame having a plurality of slots, each slot having a first prescribed number of bits for dedicated physical control channel (DPCCH) and a second prescribed number of bits for dedicated physical data channel (DPDCH), wherein at least one of the DPCCH or DPDCH includes a prescribed pattern for stopping common packet channel (CPCH) transmission;

detecting the prescribed pattern; and stopping the CPCH transmission.

16. The method of claim 15, wherein the prescribed pattern indicates an emergency stop of a packet transmission through the CPCH.

17. The method of claim 15, wherein the prescribed pattern is inserted into one of:

the DPDCH for an emergency stop of a packet transmission through the CPCH;

a TPC field of the DPCCH for lowering a power of data transmission through the CPCH;

DPDCH and the TPC;

a pilot field of the DPCCH for the emergency stop of the packet transmission through the CPCH;

the TPC field of the DPCCH and the DPDCH, the DPDCH having a bit pattern perpendicular to the pilot field of the DPCCH; and the TPC, the pilot field of the DPCCH and the DPDCH.

18. A base station, comprising:

means for receiving packet transmission through a common packet channel CPCH;

means for detecting an abnormal condition in a network; and means for transmitting a frame having a command to stop the CPCH transmission when the abnormal condition is detected, wherein the frame includes a plurality of slots, each slot having a first prescribed number of bits for a dedicated physical control channel (DPCCH) and a second prescribed number of bits for a dedicated physical data channel (DPDCH), wherein a prescribes pattern corresponding to the command for stopping the CPCH transmission is provided within the frame of at least one of the DPCCH of DPDCH.

19. The base station of claim 18, wherein the command corresponds to an emergency stop of data transmission through the CPCH.

20. A user equipment (UE) comprising:

means for transmitting data through a common packet channel (CPCH);

means for receiving a frame having a command to stop the CPCH transmission, wherein the frame comprises a plurality of slots, each slot having a first prescribed number of bits for a dedicated physical control channel (DPCCH) and a second prescribed number of bits for a dedicated physical DPDCH, wherein a prescribed pattern corresponding to the command for stopping the CPCH transmission is provided within the frame of at least one of the DPCCH or DPDCH.

21. A method for emergency stop of a packet transmission on a common packet channel (CPCH) is a communication system, the method comprising:

transmitting a corresponding packet through an uplink (UL) CPCH by a user equipment (UE);

sending a predetermined bit pattern of [1111] to the user equipment (UE) through a downlink (DL) dedicated physical control channel (DPCCH);

detecting the predetermined bit pattern of [1111] of an emergency stop command by the UE; and stopping the packet transmission through the CPCH by the UE upon detection.

22. The method of claim 21, wherein a power control bit notifying a power lowering command is transmitted in a TPC field of a DL DPCCH with the predetermined bit pattern of [1111].

* * * * *